United States Patent Office 2,816,094
Patented Dec. 10, 1957

2,816,094

AMINO-CONTAINING VINYL SULFIDES

Sidney Melamed and Warren H. Watanabe, Philadelphia, Pa., assignors to Rohm & Haas Company, Philadelphia, Pa., a corporation of Delaware No Drawing. Application May 31, 1955,
Serial No. 512,331

9 Claims. (Cl. 260—79.7)

This invention concerns vinyl sulfides having an amino group. These sulfides may also be termed thioethers and be assigned the formula $CH_2=CH-S-A-NR^1R^2$, where A is an alkylene or phenylene group and $R^1$ and $R^2$ represent either hydrogen or lower alkyl groups when taken individually or together are a divalent saturated aliphatic chain which with the nitrogen forms a five- to six-sided heterocycle.

This invention also deals with polymers, including both homopolymers and copolymers formed with other unsaturated compounds having a vinylidene group.

These thioethers are interesting chemical intermediates because they can be reacted at the vinyl group, at the amino group, or at the sulfur atom. For example, at the vinyl function they add mercaptans, alkali metal bisulfites, halogens, and halogen acids. They can also enter into addition polymerizations to give homopolymers or copolymers. They are particularly useful in forming copolymers since they can give homogeneous and uniform products. The amino group and sulfur linkage are important whether one deals with monomers of polymers.

The aminoalkyl vinyl thioethers and aminophenyl vinyl thioethers are prepared by reacting acetylene and an amino-containing thiol in the presence of a strongly basic catalyst and an organic solvent for this reaction system. Usually the reaction is carried out at reacting temperatures between about 100° and 200° C. Acetylene is supplied under pressure usually between 100 and 700 p. s. i. g. and preferably 300–500 p. s. i. g. until about the theoretical amount has been taken up. As catalyst there is used an alkali metal hydroxide, such as potassium hydroxide, or an alkali metal alcoholate, such as sodium methoxide, potassium ethoxide, potassium butoxide, or the like, generally in an amount from 1% to 10% of the weight of the amino-containing thiol.

There is used an organic solvent in which the starting thiol and catalyst have some solubility. The most useful solvents are alcohols such as the usual lower alkanols, or ether alcohols, including methoxyethanol, ethoxyethanol, butoxyethanol, ethoxyethoxyethanol, or butoxyethoxyethanol. The alcohols may be supplemented with an acetylene solvent which is inert to the reactants including polyethers such as the dimethyl ether of ethylene glycol, dimethyl or diethyl acetal or formal.

As starting amino-containing thiols, there may be taken any of the aminobenzenethiols or aminotoluenethiols or other comparable aminophenyl compounds having inert substituents in the ring or on the amino nitrogen, as in N,N-dimethylaminobenzenethio or N,N-dibutylaminobenzenethiol, or an aminoalkanethiol, including β-aminoethanethiol, N,N-dimethylaminoethanethiol, diethylaminoethanethiol, dibutylaminoethanethiol, morpholinoethanethiol, piperidinoethanethiol, pyrrolidinoethanethiol, morpholinopropanethiol, pyrrolidinobutanethiol, aminobutanethiol, dimethylaminobutanethiol, diethylaminohexanethiol, dimethylaminododecanethiol, ω-aminododecanethiol, and isomers and homologues of these compounds.

There are at least two carbon atoms between nitrogen and sulfur in these compounds.

Typical preparations of the thioethers of this invention are described in the following illustrative examples, wherein parts are by weight unless otherwise designated.

Example 1

To an autoclave equipped with stirrer there are charged in order 232.7 parts of 2-aminobenzenethiol, 129.6 parts of a solution of 18.6 parts of potassium butoxide in n-butyl alcohol, and 80.3 parts of n-butyl alcohol. The autoclave is swept out several times with nitrogen and then three times with acetylene. It is heated to 107° C. and acetylene is pressed in at 440–450 p. s. i. while the temperature is held at 125°–130° C. by heating and cooling as required. Acetylene absorption is rapid at first, but after about 30 minutes the rate of absorption drops sharply. It continues at a slow rate, however, indicating that the solvent is being vinylated. The acetylene supply is shut off. The autoclave is cooled, vented, and drained of reaction mixture. The gain in weight is 61.4 parts, corresponding to absorption of 2.4 moles of acetylene. The mixture is flash-distilled at reduced pressure into a receiver chilled with Dry Ice, yielding 468 parts of distillate and 32 parts of residue. This first distillate is carefully fractionated. At 28°–40° C./60 mm. a fraction of 84.5 parts of butyl vinyl ether is taken. A fraction of butanol is obtained up to 42° C./10 mm. After a small intermediate fraction there is obtained 234.1 parts of 2-aminophenyl vinyl sulfide at 103.5°–110° C./5 mm., a yield of 83.5%. This is redistilled at 106°–107° C./5 mm. It then has a refractive index, $n_D^{25}$, of 1.6234, a molecular refraction of 46.50 (theory 47.99), and a density, $d_4^{25}$, of 1.1117.

This compound was found to be a fungicide, giving at 0.01% concentration a 90% inhibition of germination of spores of Monilinia fructicola in a standard fungitoxicity test. It also acted as an insecticide, showing stomach poisoning action in killing 60% of bean beetle larvae on bean plants when used at 1% in a dust. Higher kills resulted with increasing concentration to the more usual 3% and 5% levels. Also, this compound was found effective as a corrosion inhibitor in aqueous acid solutions.

The properties and utilities of other aminophenyl vinyl sulfides are similar. The N,N-dimethylaminotolyl vinyl sulfides are also active as corrosion inhibitors. They are prepared in the same way as the above 2-aminophenyl vinyl sulfide, as are the isomers thereof.

Example 2

A magnetically stirred autoclave is charged with 49.9 parts by weight of crude 2-aminoethanethiol (prepared by reacting hydrogen sulfide and ethyleneimine) and 42.2 parts of a solution of potassium butoxide (6.4 parts) in butanol. The autoclave is thoroughly swept with nitrogen and with acetylene and then heated to about 100° C. Heating is discontinued while acetylene is pressed in at 400 p. s. i. The maximum temperature reached is 119° C., although the temperature during the rapid absorption period is generally between 100° and 115° C. When the rate of absorption drops, the reactor is cooled, vented, and emptied. There is a gain in weight of 8.5 parts. The reaction mixture is flash distilled at low pressure into a receiver cooled with carbon dioxide ice to give 89.4 parts of distillate and leave 11 parts of residue. The distillate is fractionated. After fractions of butyl vinyl ether and butanol have been taken off, a fraction of 34.1 parts of 2-aminoethyl vinyl sulfide is obtained. It has a refractive index, $n_D^{20}$, of 1.5252 and $n_D^{25}$ of 1.5232, a molecular refraction of 31.67 (theory 31.63), and a density, $d_4^{25}$, of 0.9955. By titration this product is 98.8% pure. It is also found to act as a fungicide and as an insecticide. It is a useful chemical intermediate.

In the same way there are reacted β-N,N-dimethylaminoethanethiol and acetylene to give N,N-dimethylaminoethyl vinyl sulfide, having a boiling point of 66° C./17 mm., a refractive index, $n_D^{25}$, of 1.4882, and a density, $d_{25}^{25}$ of 0.9114. From β-N,N-diethylaminoethanethiol there is obtained in the same way β-N,N-diethylaminoethyl vinylsulfide, having a boiling range of 91°–92° C./20 mm., a refractive index, $n_D^{25}$, of 1.4833, and a density, $d_{25}^{25}$ of 0.8996. From N,N-dimethylisopropanethiol there is obtained in the same way N,N-dimethylisopropyl vinyl sulfide, which boils at 78° C./17 mm. and has a refractive index, $n_D^{25}$, of 1.4904. In the same way 3-aminopropanethiol reacts with acetylene under the influence of a basic catalyst and in a solvent to give 3-aminopropyl vinyl sulfide, boiling at 68° C./7 mm. and having a refractive index of 1.5155 at 25° C. and a density, $d_{25}^{25}$ of 0.9765. In the same way other aminoalkanethiols react with acetylene to give corresponding aminoalkyl vinyl sulfides. Those with as many as 10 carbon atoms in the alkyl portion all exhibit some fungicidal action and act as corrosion inhibitors.

Example 3

To an autoclave equipped with stirrer there are charged 75 parts of 2-morpholinoethanethiol, 35 parts of a solution of 3 parts of potassium hydroxide in butanol, and 15 parts of dimethyl formal. The autoclave is swept with nitrogen and then with acetylene. The charge is heated to about 110° C. and acetylene is pressed in up to 480 p. s. i. g. with the temperature being carried to 135° C. The reactor is cooled and vented. The reaction mixture is flash-distilled and this first distillate is fractionated. At 101°–108° C./15–18 mm. the main fraction is taken. It consists essentially of 2-morpholinoethyl vinyl sulfide.

The same procedure applied to 2-piperidinoethanethiol leads to 2-piperidinoethyl vinyl sulfide which is obtained in the main fraction distilling at 112°–118° C./17 mm. Similarly 2-pyrrolidinoethanethiol yields 2-pyrrolidinoethyl vinyl sulfide and pyrrolidinoisopropanethiol yields pyrrolidinoisopropyl vinyl sulfide.

The amino-containing vinyl sulfides form homopolymers under the influence of cationic agents in about molar proportions or more, such as boron trifluoride and its co-ordination complexes with oxygenated organic compounds, such as ethers, alcohols, aldehydes, and carboxylic acids, zinc chloride, or stannic chloride, or in the presence of relatively small amounts of azo free radical catalysts, such as azodiisobutyronitrile, dimethyl azodiisobutyrate, or azodiisobutyramide. A type of polymer is also formed with sulfur dioxide.

Typical polymerizations are shown in the following group of examples.

Example A–1

There were mixed 30 parts of 2-aminoethyl vinyl sulfide and 3 parts of dimethyl azodiisobutyrate and the mixture was placed in a pressure vessel, which was swept out with nitrogen. Under a nitrogen atmosphere the charge was heated at 75° C. for 24 hours. The vessel was cooled and vented. The reaction product was stripped at temperatures up to 100° C. at 0.1 mm. to remove any unpolymerized material. A viscous oil was obtained. It was soluble in alcohol and dilute acid. This product is a bactericide as is also its salts. It is useful as an additive to cellulose acetate spinning dopes. The fibers containing it have high affinity for acid dyes and a marked resistance to gas-fading. This latter effect was particularly noticeable with blue dyes.

Example A–2

The procedure of Example A–1 was followed with substitution of N,N-dimethylaminoethyl vinyl sulfide. The homopolymer obtained was essentially poly(dimethylaminoethyl vinyl sulfide). An interesting use of this resin is as an intermediate in forming insoluble resins with α,ω-dihalides. Thus, 10 parts of this polymer were taken up in benzene and treated with 1.6 parts of hexamethylene dibromide in benzene. The mixture was heated at reflux with formation of an insoluble resin. It contained free amino and quaternary ammonium groups and was useful as an ion-exchange resin.

Example A–3

To 200 parts of liquid sulfur dioxide there were added dropwise 10 parts of 3-aminopropyl vinyl sulfide. The sulfur dioxide was then allowed to evaporate. A dark oil remained. It was of relatively low molecular weight as polymers go. It contained units of sulfur dioxide as well as of 3-aminopropyl vinyl sulfide.

Example A–4

A solution containing 15 parts of boron trifluoride etherate in 20 parts of benzene is slowly added to a cold solution of 15 parts of N,N-dimethylaminoethyl vinyl sulfide in 20 parts of benzene. The resulting solution is stirred at 20° C. for about two hours. It is then treated with an excess of an aqueous solution of potassium acetate and potassium hydroxide to destroy the boron trifluoride complex. The benzene solution is separated, washed, and concentrated to give poly(dimethylaminoethyl vinyl sulfide), a viscous oil which is soluble in dilute acids and in organic solvents. This polymer is useful as an additive to cellulose acetate dopes for improving dyeing properties and gas-fading.

Example A–5

A mixture of 60 parts of 2-aminophenyl vinyl sulfide and 2 parts of dimethyl azodiisobutyrate is heated at 75° C. for 16 hours under a blanket of nitrogen. The polymer which results is precipitated by adding methanol, in which the monomer is soluble but the polymer is insoluble. The polymer thus formed is a solid which by analysis contains 8.96% of nitrogen and 20.8% of sulfur (theory 9.27% and 21.2% respectively). This polymer is insoluble in water or in benzene; it is readily soluble in dimethyl formamide. It is useful as a gas-fading inhibitor. It may be applied to films or fabrics from a solution or it may be added to dopes and the dopes then converted to films or fibers containing the polymer. Again, this polymer is particularly useful to prevent gas-fading of blue dyes for cellulose acetate.

In place of the specific aminoalkyl or aminophenyl vinyl sulfides discussed just above in detail there can be used with like effect any other aminoalkyl or aminophenyl vinyl sulfides of this invention.

Copolymers formed with the aminoalkyl or aminophenyl vinyl sulfides of this invention are of peculiar interest. Here the usual types of polymerization initiators can be used to meet the needs of any particular combination of comonomers. The azo catalysts as described in detail above are widely applicable. Cationic catalysts can be effectively used where vinyl ethers of hydroxy compounds are copolymerized. Where many other polymerizable vinylidene compounds or where α,β-ethylenically unsaturated compounds such as methacrylic esters are to be copolymerized, peroxy compounds are useful, particularly when these other comonomers are used in excess of the aminoalkyl or aminophenyl vinyl sulfide.

Typical unsaturated monomers which may be used in conjunction with the vinyl sulfides of this invention include acrylic acid derivatives, such as acrylonitrile, acrylamide, methyl acrylate, ethyl acrylate, butyl acrylate, octyl acrylate, dodecyl acrylate, methoxyethyl acrylate, or benzyl acrylate, methacrylic acid derivatives such as methacrylonitrile, methacrylamide, methyl methacrylate, ethyl methacrylate, butyl methacrylate, cyclohexyl methacrylate, benzyl methacrylate, or butoxyethyl methacrylate, octyl methacrylate, dodecyl methacrylate, also ethylene diacrylate or dimethacrylate, vinyloxyethyl acrylate or methacrylate, allyl acrylate or methacrylate, vinyl ethers, including ethyl vinyl ether, butyl vinyl ether, octyl vinyl ether, ethoxyethyl vinyl ether, ureidoisobutyl vinyl ether, ethyl vinyloxyethylcarbamate, N-vinylpyrrolidone, alkyl vinyl sulfides, N-vinyl ethylene urea, N-vinyl succinimide, N-vinylphthalimide, styrene, p-methylstyrene, p-chlorostyrene, vinyltoluene, divinylbenzene, trivinylbenzene, vinyl acetate, vinyl propionate, dimethyl itaconate, dibutyl itaconate, and other polymerizable vinylidene compounds, these forming an especially desirable class of comonomers. The useful unsaturated copolymerizable materials are not confined thereto, however, as there may similarly be used dialkyl maleates, mesaconates, nitraconates, and the like.

Typical preparations of copolymers will now be described to illustrate the above disclosure more specifically.

*Example B–1*

There are mixed nine parts of β-aminoethyl vinyl sulfide, one part of divinylbenzene, and one part of azodiisobutyronitrile. The mixture is blanketed with nitrogen and heated at 65° C. for 10 hours. There is formed a hard, insoluble solid which can be fractured and crushed to provide a finely particled product which is useful as an anion-exchange resin. It is insoluble in aqueous solutions of acids and bases. It contains a large number of active amino groups which take up acids and from which the acid can be readily removed with regenerating solutions. The capacity per unit volume is high; mechanical and chemical stability are good.

*Example B–2*

There are mixed five parts of N,N-dimethylaminoethyl vinyl sulfide, 45 parts of N-vinylpyrrolidone, 0.4 parts of azodiisobutyronitrile, and 75 parts of water. The mixture is sparged with nitrogen and heated under an inert atmosphere at 65° C. for 12 hours. There results a viscous solution of polymer having in the structure thereof units of both starting materials. This copolymer is useful as a protective and decorative coating on fibers, paper, fabrics, and films. It is also useful as a sizing material, particularly on synthetic fibers, including nylon and cellulose acetate. It may be applied to such yarns in the conventional slasher operation.

*Example B–3*

There are mixed 70 parts of acrylonitrile, 22 parts of ethyl acrylate, and eight parts of N,N-diethylaminoethyl vinyl sulfide. The mixture is added with stirring to a solution of six parts of an octylphenoxypolyethoxyethanol having on average 35 ethoxy units per molecule to form an emulsion. To this emulsion is added with stirring 0.4 part of ammonium persulfate in a minimum amount of water and 1.1 parts of diethylenetriamine. An exothermic reaction soon takes place. The aqueous dispersion is maintained at about 40° C. or below with external cooling. There results a stable aqueous dispersion of a copolymer of all of the starting polymerizable vinylidene compounds. The copolymer can be precipitated by addition of methanol or a strong salt brine. The copolymer after being washed and dried can be molded. It can be dissolved in dimethylformamide to give solutions useful for coatings. Also fibers can be spun from these solutions; likewise films can be formed. When the fibers are stretched-oriented, they become strong. They are readily dyeable with acid dyes. The yarns and fabrics from these fibers have a pleasant hand. The aqueous dispersion as prepared above is useful as a coating for tile, textiles, fiber boards, pressed boards, and comparable materials.

In the same way other copolymerizable ethylenically unsaturated compounds can be mixed with one or more of the aminoalkyl or aminophenyl vinyl sulfides of this invention with the mixture then being polymerized with the aid of a polymerization initiator. The copolymers which are thus prepared can be greatly varied in properties and find many kinds of applications. In the copolymers as well as in the homopolymers the amino group supplies a desired basicity while the vinyl sulfide grouping has a valuable influence on the nature and extent of polymerization.

We claim:

1. A compound of the formula $$CH_2=CH-S-A-NH_2$$

wherein A is a member of the class consisting of phenylene groups and alkylene groups of not over ten carbon atoms with at least two carbon atoms between the sulfur and nitrogen atoms.

2. Addition polymers of a compound of claim 1.

3. Addition copolymers of a compound of claim 1 and another polymerizable vinylidene compound.

4. A compound of the formula $$CH_2=CH-S-CH_2CH_2NH_2$$

5. An addition polymer of $$CH_2=CH-S-CH_2CH_2NH_2$$

6. A copolymer of 2-aminoethyl vinyl sulfide and another polymerizable vinylidene compound.

7. A compound of the formula $$CH_2=CH-S\text{-phenyl } NH_2$$

8. An addition polymer of aminophenyl vinyl sulfide.

9. An addition copolymer of aminophenyl vinyl sulfide and at least one another polymerizable vinylidene compound.

References Cited in the file of this patent

UNITED STATES PATENTS

| | | |
|---|---|---|
| 2,511,961 | Bahner | June 20, 1950 |
| 2,517,564 | Harman | Aug. 8, 1950 |

FOREIGN PATENTS

| | | |
|---|---|---|
| 1,058,743 | France | Mar. 18, 1954 |